(12) United States Patent
Azenkot et al.

(10) Patent No.: US 10,050,774 B1
(45) Date of Patent: Aug. 14, 2018

(54) MITIGATING INTERACTION BETWEEN ADAPTIVE EQUALIZATION AND TIMING RECOVERY

(71) Applicant: MACOM Technology Solutions Holding, Inc., Lowell, MA (US)

(72) Inventors: Yehuda Azenkot, San Jose, CA (US); Bart R. Zeydel, El Dorado Hills, CA (US)

(73) Assignee: MACOM Technology Solutions Holding, Inc., Lowell, MA (US)

( * ) Notice: Subject to any disclaimer, the term of this patent is extended or adjusted under 35 U.S.C. 154(b) by 0 days.

(21) Appl. No.: 15/584,897

(22) Filed: May 2, 2017

(51) Int. Cl.
| | | |
|---|---|---|
| *H03H 7/30* | (2006.01) | |
| *H03H 7/40* | (2006.01) | |
| *H03K 5/159* | (2006.01) | |
| *H04L 7/04* | (2006.01) | |
| *H04L 7/00* | (2006.01) | |
| *H04L 25/03* | (2006.01) | |
| *H03H 17/06* | (2006.01) | |
| *H04L 27/26* | (2006.01) | |
| *H04L 25/02* | (2006.01) | |
| *H03H 21/00* | (2006.01) | |

(52) U.S. Cl.
CPC .............. *H04L 7/042* (2013.01); *H03H 17/06* (2013.01); *H04L 7/0029* (2013.01); *H04L 7/0058* (2013.01); *H04L 25/025* (2013.01); *H04L 25/03038* (2013.01); *H04L 27/2662* (2013.01); *H03H 21/0012* (2013.01); *H03H 2021/0056* (2013.01); *H03H 2021/0092* (2013.01)

(58) Field of Classification Search
CPC ..... H04L 7/042; H04L 7/0058; H04L 7/0029; H04L 25/03038; H04L 27/2662; H04L 25/025; H03H 17/06; H03H 2021/0092; H03H 2021/0056; H03H 21/0012
USPC .......................... 375/232, 235, 231, 350, 326
See application file for complete search history.

(56) References Cited

U.S. PATENT DOCUMENTS

| | | | | |
|---|---|---|---|---|
| 6,735,248 B2 * | 5/2004 | Gu | .................... | H04L 25/03038 375/232 |
| 2006/0171451 A1 * | 8/2006 | Pietraski | ........... | H04L 25/03038 375/232 |

* cited by examiner

*Primary Examiner* — Phuong Phu (57) ABSTRACT

System and method of timing recovery for recovering a clock signal with reduced interference with clock phase correction by an adaptive equalizer. The equalizer in the timing recovery loop is dynamically adapted to the current channel characteristics that vary over time. Upon a good Signal-to-Noise Ratio (SNR) being achieved, a selected set of the tap weights of the equalizer filter are frozen or set to smaller values, while others continue to adapt and the timing recovery loop continues the clock recovery process. Thereby, the adaptation of equalization can be adjusted to attenuate the equalization filter's effect on clock delay correction by limiting the adaptation time or speed relative to those of the entire timing recovery loop.

19 Claims, 10 Drawing Sheets

MITIGATING INTERACTION BETWEEN ADAPTIVE EQUALIZATION AND TIMING RECOVERY

CROSS-REFERENCE

This application is related to: the co-pending commonly-assigned U.S. patent applications Ser. No. 15/151,154, titled "TIMING RECOVERY WITH ADAPTIVE CHANNEL RESPONSE ESTIMATION," filed on May 10, 2016; the co-pending commonly-assigned U.S. patent applications Ser. No. 15/191,229, entitled "RESOLVING INTERACTION BETWEEN CHANNEL ESTIMATION AND TIMING RECOVERY," filed on Jun. 23, 2016; and the co-pending commonly-assigned U.S. patent applications Ser. No. 15/336,435, entitled "MITIGATING-INTERACTION BETWEEN ADAPTIVE EQUALIZATION AND TIMING RECOVERY," filed on Oct. 27, 2016. The contents of the foregoing patent applications are herein incorporated by reference by entirety for all purposes.

TECHNICAL FIELD

The present disclosure relates generally to the field of signal processing in communications and, more specifically, to the field of timing recovery in signal processing.

BACKGROUND OF THE INVENTION

In communications systems, a transmitter sends data streams to a receiver in symbols, such as bits of data. As the receiver clock is typically not synchronized with the transmitter clock, the receiver needs to correctly recover the clock from the received signal itself. In addition, when data is transmitted over a communication channel, it is usually distorted in terms of phase and amplitude due to various types of noise, such as fading, oscillator drift, frequency and phase offset, and receiver thermal noise. At the receiver, the system is also subject to noise and timing jitter in a time domain. Therefore, the receiver needs a timing recovery process to obtain symbol synchronization, particularly to correct the clock delay and derive the optimal clock phase that is used to sample the received signal and achieve the best Signal-to-Noise Ratio (SNR).

Commonly, in an equalizer-based timing recovery loop of a receiver, an adaptive equalizer is employed to mitigate the effect of intersymbol interference (ISI) caused by the channel distortion. An adaptive equalizer enables the equalization process to be adapted to changes in channel characteristics over time. Typically, the adaptation is performed by dynamically adapting equalization parameters, such as the tap weights of an equalization filter.

Adaptive equalization itself can also result in correction for time delays of the input clock embedded in the received signal, which undesirably interferes with the clock recovery process by the overall timing recovery loop, e.g., to be performed by a phase detector, a loop filter and a VCO in the same timing recovery loop. Particularly, the interference may cause recovered data symbols to shift from their optimized locations. Thus, it is desirable that only the timing recovery loop corrects for delay of the input clock in the received signal.

Conventionally, the problematic interaction between an adaptive equalizer and the associated timing recovery loop is solved by freezing or slowing down the adaptation of the equalizer once acquisition is achieved. More specifically, all the tap weights of the equalization filter are fixed or adapted in small steps to prevent the interaction with the timing recovery loop regarding time delay correction. Unfortunately, freezing or slowing down the equalizer adaptation process inevitably impairs the equalizer's capability of tracking changes in channel characteristics over time.

SUMMARY OF THE INVENTION

Accordingly, disclosed herein provide a mechanism to reduce or eliminate the interaction with respect to clock delay correction between adaptive equalization and timing recovery in an equalizer-based timing recovery loop, and yet preserve the capability of adaptation in the equalization process.

In one aspect of the present disclosure, embodiments of the present disclosure control the adaptation of equalization to restrict or eliminate the equalization filter's effect on clock delay correction by limiting the adaptation time or speed relative to those of the entire timing recovery loop. More specifically, in some embodiments, upon a good Signal-to-Noise Ratio (SNR) being achieved, a selected set of the tap weights of the equalizer filter are frozen while others continue to adapt and the timing recovery loop continues the clock recovery process. In some other embodiments, upon a good Signal-to-Noise Ratio (SNR) being achieved, selected set of step sizes are decreased to slow down adaptation speed relative the timing recovery loop speed.

In another aspect of the present disclosure, embodiments of the present disclosure employ an equalizer capable of detecting a correction in clock delay resultant from equalization adaptation, and accordingly compensating the correction before sending an equalized signal to a phase detector and other downstream components in the timing recovery loop for clock recovery. In an equalization adaptation process, the equalizer coefficients are dynamically adapted to time-variant channel characteristics of a communication channel. At the same time, a current Center of Filter (COF) value is determined and used as a measure for clock delay correction resulting from the equalization adaptation. In some embodiments, COF is defined as a function of one or more tap weights depending on the configuration of the phase detector.

During operation, the tap weights of the equalization filter vary with time in adaptation to variations in the communication channel characteristics. The current COF value of the filter is calculated and compared with a nominal COF value to generate a COF offset. A set of selected tap weights are adjusted based on the COF offset by interpolating/extrapolating another set of selected tap weights. The adjusted tap weights are fed back for adaptive equalization, which in turn leads to reduced COF offset. As a result, clock delay correction introduced by the adaptive equalization process is compensated, and its interaction with the timing recovery loop can be effectively and advantageously prevented.

According to one embodiment of the present disclosure, a method of timing recovery for signals transmitted via serial link includes: generating an equalized signal responsive to a digital input signal in an adaptive equalization process. A correction in clock delay associated with the digital input signal is caused by dynamic equalization adaptation. The correction in clock delay is detected by monitoring a COF value of the equalization filter. Based on the COF value, the equalization process is adjusted through updating selected tap weights of the equalization filter, thereby compensating the detected correction resulted from equalization adaptation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

BRIEF DESCRIPTION OF THE DRAWINGS

Embodiments of the present invention will be better understood from a reading of the following detailed description, taken in conjunction with the accompanying figures, in which like reference characters designate like elements and in which.

Overall, embodiments of the present disclosure provide a timing recovery mechanism for recovering a clock signal and yet preserving the capability of preventing undesirable interaction between an adaptive equalizer and the overall timing recovery loop with respect to clock phase recovery. Particularly, for an equalizer filter (or equalization filter), the offset between a current Center of Filter (COF) value and a nominal COF value is used as a measure for a clock phase correction resulted from an adaptive equalization process. In some embodiments, a COF may be defined as a function of two selected tap weights or equal to a selected tap weight. The tap weights of the equalizer filter are adjusted to decrease the offset, e.g., by interpolating/extrapolating selected tap weights based on the offset. In this manner, the clock delay correction contributed by the adaptive equalization process is compensated and its potential interaction with the timing recovery process is reduced or eliminated.

Moreover, to prevent undesirable interaction between the equalizer and the overall timing recovery loop with respect to clock phase recovery, the adaptation of equalization may also be controlled in terms of speed or time to limit or eliminate the equalizer's effect on clock phase correction.

Figure 1:
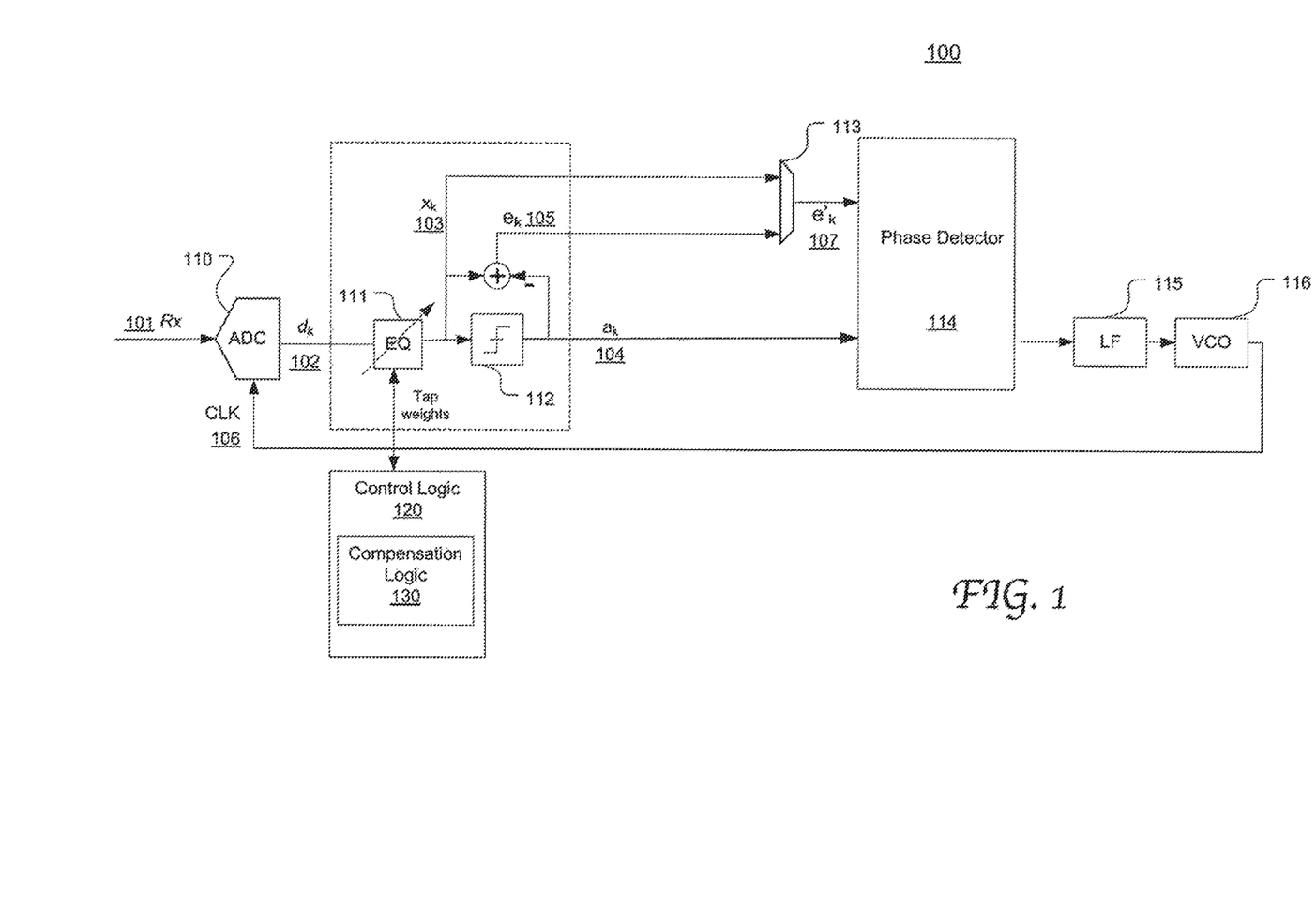
FIG. 1 illustrates the configuration of an exemplary equalizer-based timing recovery loop capable of compensating clock delay correction caused by equalization adaptation according to an embodiment of the present disclosure.

As noted above, an equalizer can cause clock delay correction when it is adaptive to the time-varying channel characteristics. The adaptation is typically implemented by adapting the tap weights of the equalizer filter. FIG. 1 illustrates the configuration of an exemplary equalizer-based timing recovery loop 100 capable of compensating clock delay correction caused by equalization adaptation according to an embodiment of the present disclosure.

As illustrated, the timing recovery loop 100 includes an Analog-to-Digital Converter (ADC) 110, an equalizer 111, a slicer 112, a selector 113, a phase detector 114, a loop filter 115, and a Voltage Controlled Oscillator (VCO) 116. A received analog signal $R_x$ 101 is converted by the ADC 110 to a digital signal $d_k$ 102 and then supplied to the equalizer 111 and the slicer 113. The equalizer 111 is used to render a flat frequency response in the signal and output an equalized signal $x_k$ 103. After sampling at the slicer 112, the estimated symbols $a_k$ 104 are produced and supplied to the phase detector 114.

An error signal $e_k$ 105 is generated by comparing the equalized signal $x_k$ 103 and the estimated symbols $a_k$ 104. The error signal $e_k$ 105 and the equalized signal $x_k$ 103 are also fed to the phase detector 114 through the selector 113.

The phase detector 114 generates a phase error based on the difference between the selector output $e_k'$ 107 and the estimated symbols $a_k$ 104. The loop filter 115 averages the phase error, and the VCO 116 adjusts the effective sampling frequency and phase based on the average phase error. As a result, a recovered clock signal 106 is generated from the VCO 116 and, in turn, used to clock the ADC 110 for sampling as well as to clock downstream processing logic. The performance of symbol synchronization can be indicated by a Signal-to-Noise Ratio (SNR) or other suitable parameters related to the noise level in the data stream.

The phase detector 114, loop filter 115, and VCO 116 can be implemented in any suitable configuration that is well-known in the art. For example, the phase detector 114 can be based on a Mueller Muller algorithm as described in greater detail below. The loop filter 115 can be a typical digital filter for a second-order Phase Lock Loop (PLL). The VCO 116 may include a Phase-Locked Loop (PLL). Alternatively, the VCO 116 may be replaced with a phase interpolator using a programmable gain element, a digital interpolator, and/or an analog interpolator. For example, the digital interpolator includes a register and an adder. The analog phase interpolator receives a reference clock and outputs a clock signal with a phase that is a function of the input. In addition, an equalizer-based timing recovery loop capable of compensating clock delay correction caused by equalization adaptation may include various other components that are well-known in the art without departing from the scope of the present disclosure.

The adaptive equalizer 111 may be a Feed-Forward Equalizer (FFE) implemented via a Finite Impulse Response (FIR) filter or a Decision Directed Equalizer (DDE) which includes an FFE and a feedback equalizer (FBE). However, the present disclosure is not limited thereto.

The equalizer filter (e.g., an FIR filter) is an adaptive filter which enables it to track any changes over time of a transmission channel. During adaptation, the tap weights of the equalizer filter may be updated through a Least-Mean-Square (LMS) adaptation process with programmable step sizes for the taps. Especially, it's typical to have a different step size for the main three taps, namely the reference tap (RefTap) and the taps before and after the RefTap.

The adaptation can also result in correction of time delay in the channel. As noted above, this is problematic as it may interfere with timing recovery by the overall timing recovery loop. According to the present disclosure, the adaptive equalizer 111 is coupled to control logic 120 configured to control equalization adaptation to mitigate or prevent the interference in time delay correction.

According to one aspect of the present disclosure, the interference in clock delay correction can be mitigated by slowing down or suspending the adaptation of selected main taps in the equalizer. More specifically, in some embodiments, the control logic 120 is capable of detecting a SNR during the equalization process, e.g., in the equalized signal. After a satisfactory SNR is achieved, the control logic 120 instructs to freeze the tap weights of the $w_{-1}$ tap (before the RefTap) and $w_1$ tap (after the RefTap) of the equalizer filter, for example by setting the step size of the $w_{-1}$ and $w_1$ taps to 0. All the other weights (taps) can continue adapting. As a result, the adaptation of the equalizer filter is substantially slowed down.

In some other embodiments, the control logic 120 may slow down the adaptation of the main taps in the equalizer filter relative to the timing recovery loop 1/BW, where BW is the timing recovery loop bandwidth. For example, this can be achieved by using small step sizes for the main two weights ($w_{-1}$ and $w_1$ taps). All the other taps can adapt to the channel variations over time at higher speed.

According to another aspect of the present disclosure, the control logic is configured to detect in real-time the amount of correction of time delay that results from the adaptation of equalization filter, and dynamically compensate the correction by modifying the tap weights of the filter. The present disclosure is not limited to any specific parameter used to monitor the amount of correction of time delay that results from the adaptation of equalization.

Figure 3:
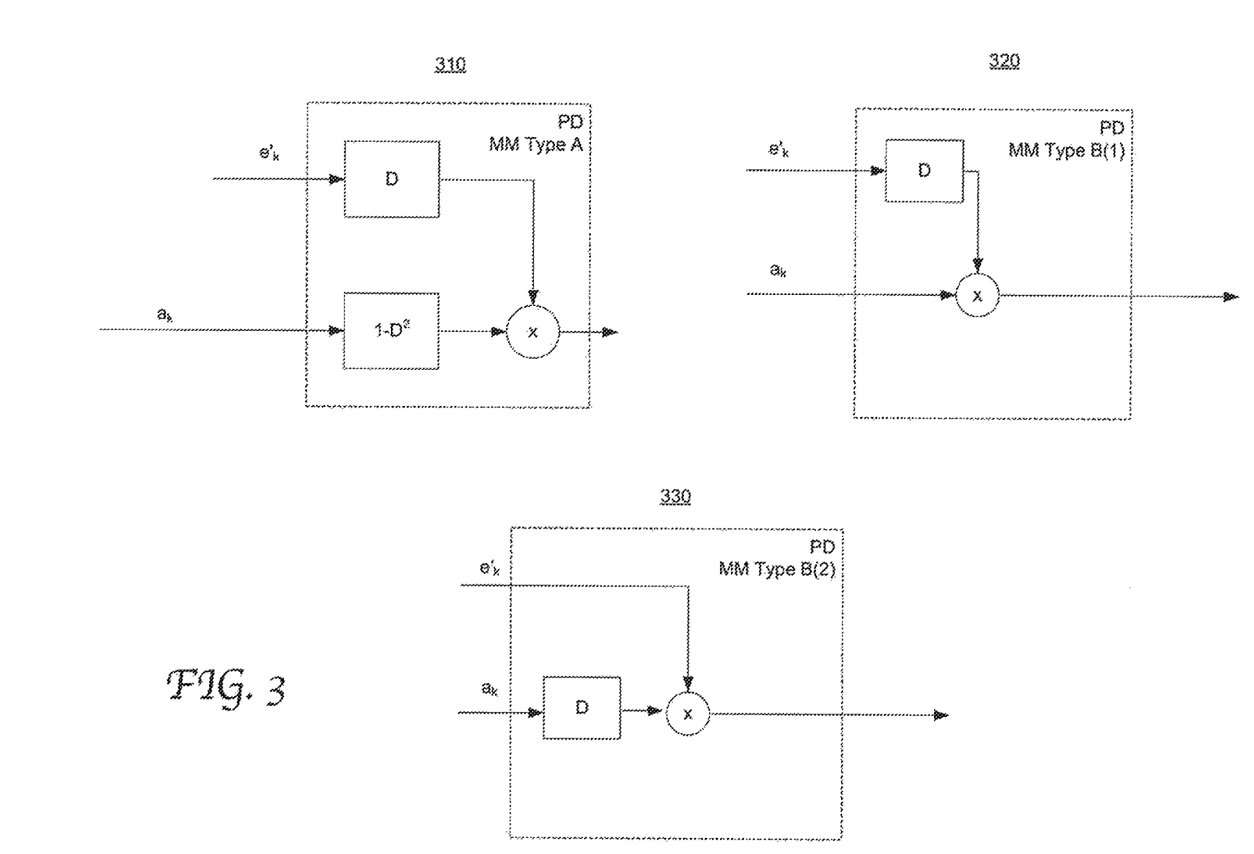
FIG. 3 illustrates the configurations of exemplary phase detectors that can be used in an equalizer-based timing recovery loop in accordance with an embodiment of the present disclosure.

As described in greater detail below, in some embodiments, Center of Filter (COF) can be used as a measure for a clock delay correction introduced during adaptive equalization. In some embodiments, the definition of Center of Filter (COF) is dependent on the type of the phase detector used in the timing recovery loop (as shown in FIG. 3). In the example described in detail herein, $$COF = \begin{cases} w_1 - w_{-1} & PD \text{ Type } A \\ w_{-1} & PD \text{ Type } B \end{cases} \quad \text{(Equation 1)}$$

where $w_1$ is the weight of the tap after the RefTap and $w_{-1}$ is the weight of the tap before the RefTap, the RefTap being the tap associated with the maximum tap weight. The COF can be calculated and saved into a register continuously following any change in the equalizer weights due to adaptation or COF compensation. It will be appreciated that the present disclosure is not limited to any specific definition of COF. Also, the definition of COF may vary with the particular configurations of the timing recovery loop and the components therein.

Figure 2:
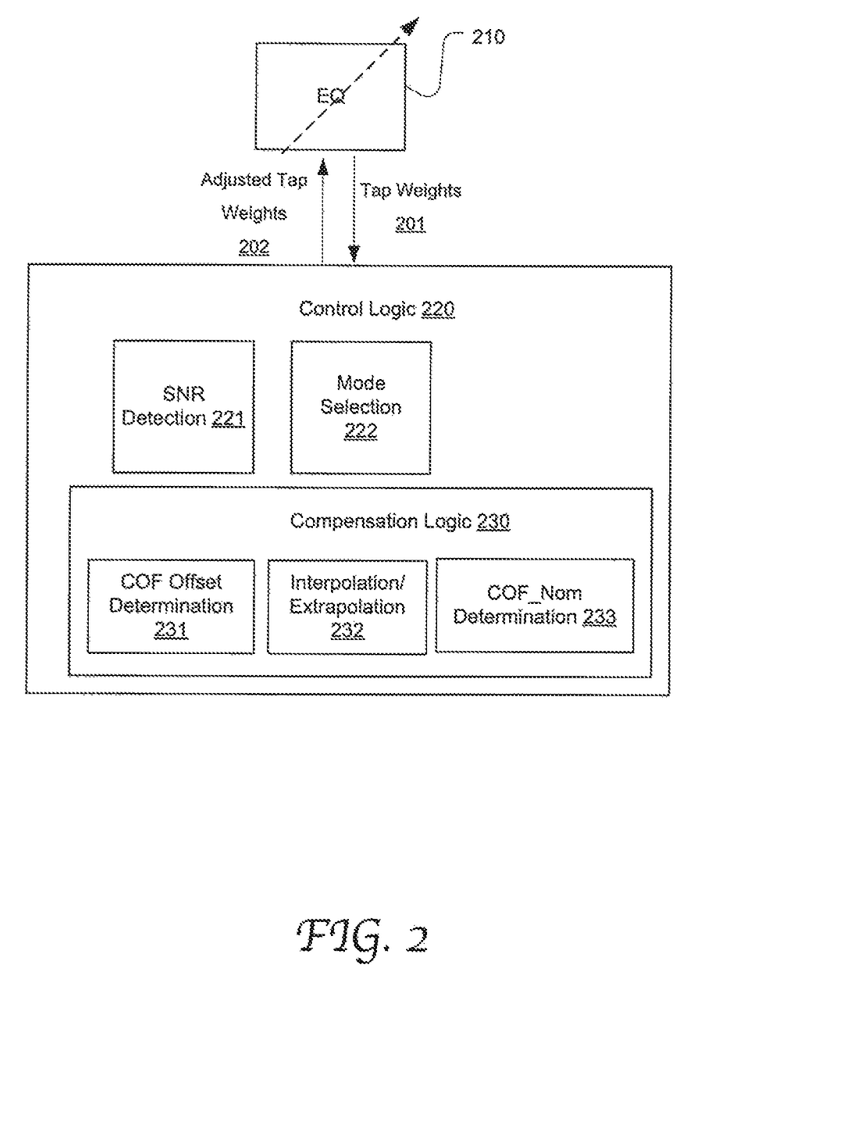
FIG. 2 illustrates the configuration of exemplary control logic coupled to an adaptive equalizer and operable to detect and compensate clock delay correction introduced by the adaptive equalizer according to an embodiment of the present disclosure.

FIG. 2 illustrates the configuration of exemplary control logic 220 coupled to an adaptive equalizer 210 and operable to detect and compensate clock delay correction introduced by the adaptive equalizer 210 according to an embodiment of the present disclosure. It will be appreciated that the present disclosure is not limited to any specific type of equalizer or any specific process or mechanism of adaptive equalization. The implementation of the equalizer is dependent on the adaptive process in the specific embodiment, such as an LMS adaptation process or any other method that is well-known in the art. In this example, the equalizer 210 includes a filter having multiple taps, for instance, an FIR filter with 8 taps. Controlled by the adaptation logic in the equalizer 210, the tap weights of the equalizer filter are adapted through an LMS adaptation process.

According to embodiments of the present disclosure, the control logic 220 includes SNR detection module 221, a mode selection module 222 and compensation logic 230. The compensation logic 230 is configured to detect in real time, and accordingly compensate for, the clock phase correction caused by the adaptive equalization process. In the illustrated example, the compensation logic 230 is equipped with the COF offset determination logic 231 for calculating COF offset based on the tap weights of the filter in the equalizer 210. COF offset corresponds to a difference between the current COF and a COF_nom value which can be determined by the COF_Nom determination logic 233. The COF offset serves to indicate the amount and direction (positive or negative) of clock delay correction contributed by the adaptive equalization process.

The interpolation/extrapolation logic 252 in the compensation logic 230 interpolates and/or extrapolates a set of selected tap weights to adjust another set of selected tap weights based on the COF offset, as described in greater detail below. The control logic 220 may be implemented using logic circuitry, a programmable microcontroller, a combination thereof, or any other suitable means.

The mode selection logic 222 can select an operation mode of the equalizer 210 by selectively disabling or enabling its adaptation logic and the compensation logic 230. The operation mode can be selected based on the SNR as detected by the SNR detection logic 221. Various operational modes are described in greater detail below with reference to FIGS. 5-7.

During operation, the adjusted tap weights 202 are output from the control logic 220, supplied back to the equalizer 210 and used for equalization, leading to reduced COF offset. As a result, clock delay correction introduced by adaptive equalization can be compensated, and its interaction with the timing recovery loop can be effectively and advantageously prevented. Also, since the tap weights as adjusted based on the time delay correction that is dynamically calculated using COF offset as the metric, interference with the equalization adaptation caused by the tap weight adjustment is advantageously controlled to a minimal level.

FIG. 3 illustrates the configurations of exemplary phase detectors that can be used in an equalizer-based timing recovery loop in accordance with an embodiment of the present disclosure. The phase detectors can be used as the phase detector 114 in FIG. 1. A timing recovery loop may be equipped with or more types of phase detectors. Depending on the configuration of the phase detector that is enabled, the COF compensation logic may select the corresponding COF calculation. Diagram 310 shows the configuration of a "type A" phase detector based on the Mueller Muller (MM) algorithm. The (original) Mueller-Muller (MM) phase detector type A is given by:

$$x_k a_{k-1} - x_{k-1} a_k$$

where, for equalizer-based timing recovery, $x_k$ is the slicer input at the $k^{th}$ sample and $a_k$ is the slicer decision at the $k^{th}$ sample (as shown in FIG. 1).

In an alternative implementation of MM type A, $$e_{k-1} \cdot (a_k - a_{k-2})$$

which is equivalent to:

$$e_{k-1} a_k - e_{k-1} a_{k-2}$$

$$-(e_{k-1} a_{k-2} - e_{k-1} a_k)$$

Since the loop averages the phase detector output, the index of the first term can be shifted by +1, which gives:

$$-(e_k a_{k-1} - e_{k-1} a_k).$$

This is equivalent to the original MM type A equation.

Diagram 320 shows the configuration of a "type B(1)" phase detector based on the Mueller Muller algorithm. Diagram 330 shows the configuration of a "B(2)" phase detector based on the Mueller Muller algorithm The MM phase detector type B(1) can be given by:

$$x_k a_{k-1}$$

In another version of Mueller-Muller PD type B, the slicer error, $e_k$, replaces the slicer input, $x_k$, which gives $$-e_k a_{k-1}.$$

The timing recovery loop zeros the post-cursor $w_1$ when MM Type B phase detector is used.

In type B(2) phase detector, the slicer error, $e_k$, replaces the slicer input, $-x_k$, giving:

$$-(e_k a_{k-1} - e_{k-1} a_k)$$

where the slicer error $e_k$ is given by $$e_k = a_k - x_k.$$

The two versions are equivalent because the mean of $a_k$ is zero.

In still another version of Mueller-Muller PD type B, the slicer error, $e_k$, replaces the slicer input, $x_k$, which gives $$e_{k-1} a_k.$$

Exemplary definitions of COF corresponding to these types of phase detectors are presented in Equation 1. Functions of these types of phase detectors are well known in the art and detailed description related thereto is omitted for brevity. It will be appreciated that any other suitable type of phase detector can also be used without departing the scope of the present disclosure. In such case, the definition of COF may change accordingly.

Figure 4:
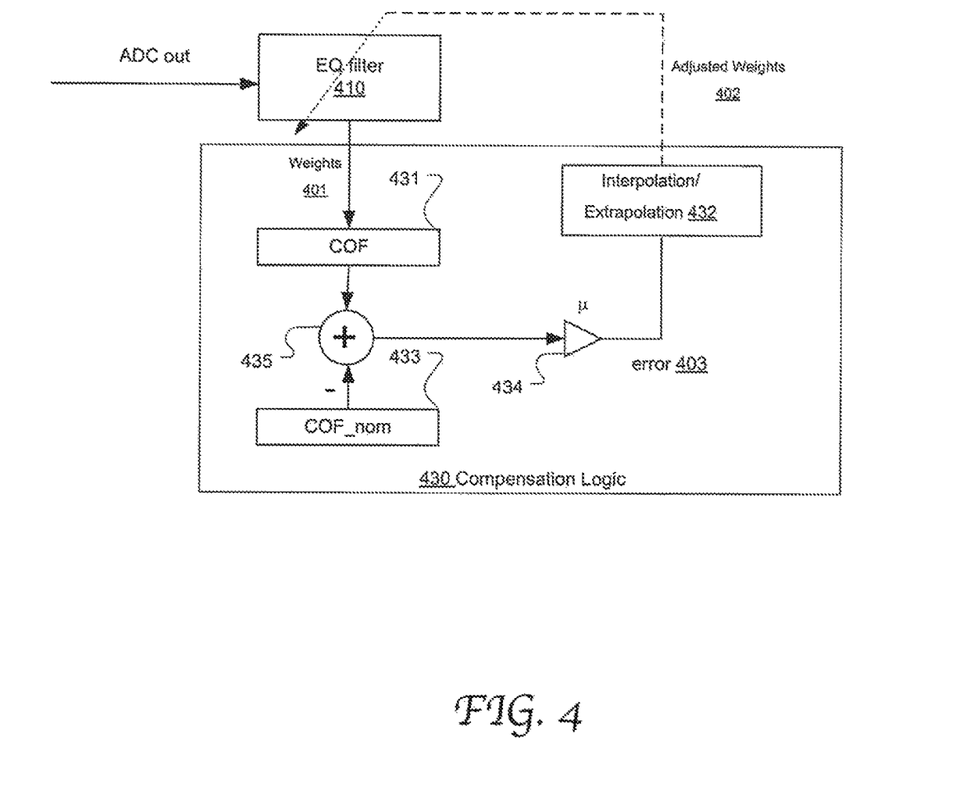
FIG. 4 illustrates the configuration of exemplary COF compensation logic coupled to the equalizer filter in accordance with an embodiment of the present disclosure.

FIG. 4 illustrates the configuration of exemplary COF compensation logic 430 coupled to the equalizer filter 410 in accordance with an embodiment of the present disclosure. The COF determination logic 431 can receive tap weights 401 of the equalizer filter 410 and calculate the current COF value (or "the COF") of the equalizer filter 410, for example as defined in Equation 1. The COF is calculated and saved into a register continuously following any change of the tap weights due to adaptation or COF correction.

The COF compensation logic 430 includes a register 433 storing a nominal COF value (COF_nom), the COF determination logic 431 for computing the COF, an adder 435 for generating the COF offset, a multiplier 434 for multiplying the COF offset with a efficient μ to generate the error 403, and the interpolation/extrapolation logic 432.

During operation, if the COF is shifted relative to COF_nom, the COF can be corrected by modifying a set of selected taps of the equalizer filter, e.g., the main three taps. An alternative approach is to modify all the tap weights of the equalizer filter 410. Modification of the tap weights can be performed by interpolating/extrapolating the main three or five taps, or etc.

For example, if COF of the equalizer filter is shifted relative to COF_nom (as stored in the COF_nom register) due to LMS, the COF is corrected by modifying the main two or one taps of the Equalizer. The updated two main weights are corrected by the error (e.g., the error 403 in FIG. 4):

$$e = \mu \cdot (COF - COF\_nom), \quad \text{(Equation 2)}$$

where the coefficient μ can depend on a programmable value n. For instance, μ can be defined as $$\mu = \begin{cases} 2^{-n}, & n = 0:30 \\ 0, & n = 31 \end{cases} \quad \text{(Equation 3)}$$

where the default can be set as n=4; and, when n=31, the COF correction is disabled.

COF correction can be implemented in various suitable methods. In a first exemplary method, the COF correction is performed via linear interpolation based on 3 (or 5) main taps. When 5 main taps are used, a linear interpolation is applied to get the 3 corrected main taps. When 3 main taps are used, an interpolation or extrapolation is used to get the corrected 3 main taps.

To simplify the implementation, the difference ΔCOF=COF−COF_nom can be approximated, so the implementation can use a shifter instead of a multiplier. For example, it can be approximated as:

$$\Delta COF \approx \text{sign}(\Delta COF) \cdot 2^{rnd(log2(abs(\Delta COF)))}$$

where "rnd" represent round, and abs represents absolute value. When $\Delta COF=0$, set $e=0$.

Corrections of the two main taps (before and after the RefTap) based on 3 tap weights can be given by:

$$y_1 = (w_1 - w_0) \cdot e + w_1$$

$$y_{-1} = (w_0 - w_{-1}) \cdot e + w_{-1}$$

where the 3 old main weights are $w_{-1}$, $w_0$, $w_1$, and the new 3 weights are $y_{-1}$, $y_0$, $y_1$. In this example, the weight of the RefTap is not corrected.

However, in an alternative embodiment, the RefTap can be corrected in combination with correction of the other two main taps as shown above. The RefTap correction can be represented as:

$$y_0 = (w_1 - w_0) \cdot e + w_0, \ e \geq 0$$

$$y_0 = (w_0 - w_{-1}) \cdot e + w_0, \ e < 0$$

In a second exemplary method, the correction of the main 3 taps based on 5 tap weights. For example, the new 3 main weights $y_i$, $i=-1,0,+1$, can be given by:

$$y_i = (w_{i+1} - w_i) \cdot e + w_i, \ e \geq 0, \ i = -1, 0, +1$$

$$y_i = (w_i - w_{i-1}) \cdot e + w_i, \ e < -1, 0, +1$$

That is, $$y_0 = (w_1 - w_0)e + w_0, \ e \geq 0$$

$$y_0 = (w_0 - w_{-1}) \cdot e + w_0, \ e < 0$$

$$y_1 = (w_2 - w_1) \cdot e + w_1, \ e \geq 0$$

$$y_1 = (w_1 - w_0) \cdot e + w_1, \ e < 0$$

$$y_{-1} = (w_0 - w_{-1}) \cdot e + w_{-1}, \ e \geq 0$$

$$y_{-1} = (w_{-1} - w_{-2}) \cdot e + w_{-1}, \ e < 0$$

In a third exemplary method, the two main weights $w_1$ and $w_{-1}$ are adjusted alternately in consecutive cycles. For example, $$w_1 = w_1 - e$$

$$w_{-1} = w_{-1} + e.$$

The duration of the alternation can be set by a counter. For instance, the default value of the duration is set as 1, and the correction sequence is; $w_1$, $w_{-1}$, $w_1$, $w_{-1}$, . . . , etc. A "STATE" register can be used and toggle between 0 and 1 after the counter reaches its end. When STATE=0, $w_{-1}$ is updated, and when STATE=1, $w_1$ is updated.

A programmable register "COF_TAP_CORRECTION" may be used, in combination with the STATE register, to control which taps are corrected based on COF offset. For instance, the values of the COF_TAP_CORRECTION can be defined as follows:

$$\text{COF\_TAP\_CORRECTION} = \begin{cases} 00, & \text{Corrects} & \text{none} \\ 01, & \text{Corrects} & w_1 \\ 10, & \text{Corrects} & w_{-1} \\ 11, & \text{Corrects} & w_{-1} \ \& \ w_1 \text{ (default)} \end{cases}$$

Although embodiments of the present disclosure described herein use linear interpolation/extrapolation, various other suitable techniques, mechanisms, algorithms and methods that are well known in the art can be used to modify the tap weights for COF correction purposes. For example, exponential or parabola interpolation can be used instead. Further, the tap weights or other type of coefficients of an equalization filter can be updated for purposes of COF correction in any other suitable method or algorithm that is well known in the art.

The RefTap location refers to the tap index of the main tap that has the maximum absolute tap weight. When the tap weights are updated due to adaptation or COF correction, the RefTap may change to another location (a different tap index). In some embodiments, once the location of a RefTap is changed as a result of updating the tap weights (e.g., the main three taps), the updated tap weights are discarded and the previous values of these tap weights are loaded back.

A variety of techniques, processes, methods and algorithms can be used to acquire a COF_nom without departing from the scope of the present disclosure. In one embodiment, a COF_nom can be user-assigned based on the expected channel characteristics. In some other embodiments, a COF_nom can be obtained through programmed tryouts using a number of candidate COF_nom values. The candidate value that yields an optimal performance can be selected as the COF_nom used for subsequent signal processing.

In still some other embodiments, the nominal COF of the equalizer is obtained after a successful timing recovery acquisition where the equalizer SNR is above a programmable threshold, or the equalizer noise is below a programmable threshold. The equalizer noise can be obtained via averaging of a squared slicer error for example.

In an acquisition state, the timing recovery loop runs for a programmable number of symbols. The programmable number is stored in a register and used to define the duration of the acquisition process. The mean squared error or the SNR of the equalizer signal, the mean squared error of the equalized signal and the COF values are saved, while the tap weights updating based on computed COF offset is disabled. At the end of the acquisition, a COF that corresponds to an optimal SNR may be selected as the COF_nom. In the tracking state, the tap weights are updated based on the computed COF offset.

A timing recovery loop according to the present disclosure can operate in various optional modes depending on whether COP compensation and equalization adaptation are enabled. In each mode, the timing recovery loop may operate in one of the two states: acquisition and tracking.

In the acquisition state, the timing recovery loop runs for a programmable number of symbols set by a register ("acquisition_duration" register). The mean squared error of the equalized signal and COF values are saved (updating is stopped) at the end of the acquisition state. Alternatively, the acquisition state is not controlled by the acquisition_duration register, but rather by the firmware. In the tracking state, the timing recovery process runs continuously.

In some embodiments, optimal tap weights and/or COF_nom may be obtained in an initial searching stage, and used as initial values for the subsequent equalization process, as described in greater detail with reference to FIGS. 5-7. Processes described with reference to FIGS. 5-7 can be performed by the timing recovery loop 100 in FIG. 1 using different configurations.

Figure 5:
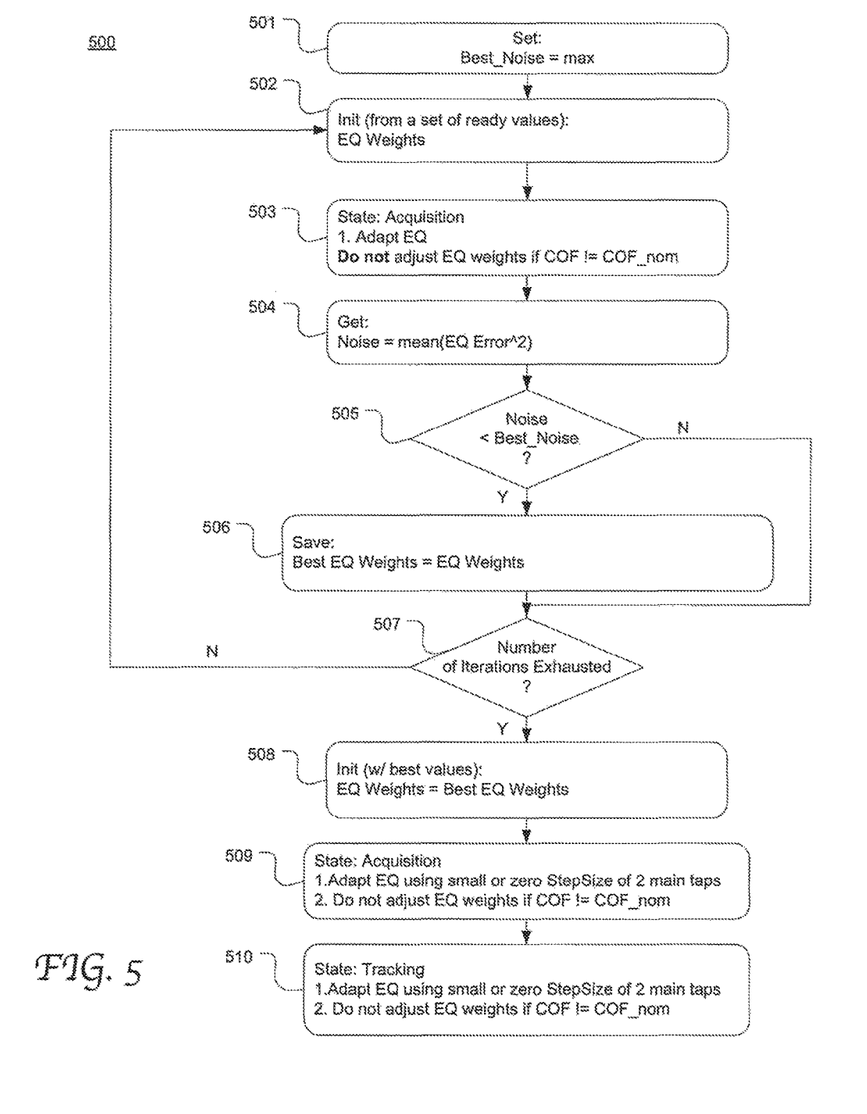
FIG. 5 is a flow chart of pseudo code for an exemplary equalization process with equalization adaptation enabled and COF correction disabled according to an embodiment of the present disclosure.

FIG. 5 is a flow chart of pseudo code for an exemplary equalization process 500 with equalization adaptation enabled and COF correction disabled according to an embodiment of the present disclosure. In this mode, the equalizer filter tap weights are initialized in the acquisition state with ready values and are adapted iteratively based on the evaluation of the resulted noise in the initial searching process (502-507). The adaptation steps are set to be small values to reduce or eliminate the interaction in clock delay correction between the equalizer and the overall timing recovery loop. For example, the adaptation steps for the two main taps before and after RefTap are set to very small values or even zero.

More specifically, at 501, a noise threshold (Best_Noise) is set as "max." At 502, the tap weights of the equalizer filter (EQ Weights) are initialized using a set of ready values. At 503, the acquisition state is configured such that the equalizer is dynamically adaptive to channel characteristics, but the tap weights are not adjusted even if the COF is not equal to COF_nom. At 504, the equalizer error is averaged and saved as "Noise." At 505, it is determined if Noise is less than Best_Noise. If yes, the tap weights are saved as the "Best EQ Weights" at 506. It is checked at 507 whether the number of iterations has been exhausted. If not, the foregoing 502-507 are repeated to obtain a set of weights that lead to a satisfactory noise level of the equalizer.

If the number of iterations has been exhausted, the tap weights are assigned with Best EQ Weights at 508. In subsequent equalization process, both the acquisition state 509 and the tracking state 510, the tap weights of the equalizer filter are adaptive. However, the weights are not adjusted based on COF even if the COF is not equal to the COF_nom.

Figure 6:
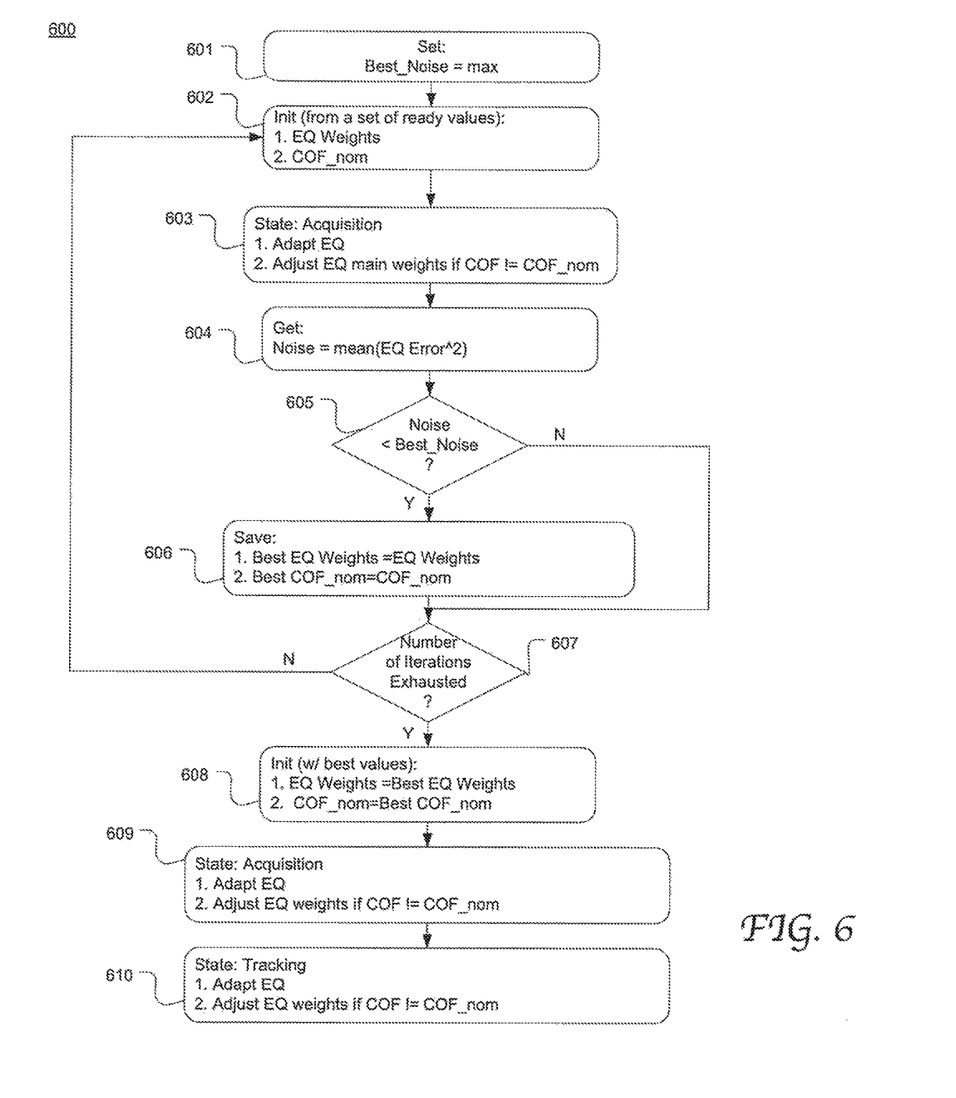
FIG. 6 is a flow chart of pseudo code for an exemplary equalization process with both equalization adaptation and COF correction enabled according to an embodiment of the present disclosure.

FIG. 6 is a flow chart of pseudo code for an exemplary equalization process 600 with both equalization adaptation and COF correction enabled according to an embodiment of the present disclosure. For instance, the two main taps before and after RefTap are adapted during both the acquisition and tracking states. The COF is constantly modified, and the COF correction tries to correct the COF to keep it close to COF_nom.

In the acquisition state, the tap weights and COF_nom of the equalizer filter are initialized. While applying equalization adaptation, the weights of the main taps are corrected so the COF is kept close to COF_nom. After acquisition, if the SNR is below a programmable threshold, another set of tap weights of the equalizer and COF_nom are initialized and the timing recovery loop is restarted until the SNR is above a certain threshold. An alternative approach is to select the best set of initial tap weights of the equalizer and COF_nom that achieved the maximum SNR between couples of tryouts.

More specifically, at 601, a noise threshold (Best_Noise) is set as "max." At 602, the tap weights and COF_nom are initialized using a set of ready values. At 603, the acquisition state is configured such that the equalizer is dynamically adaptive to the channel characteristics and continuously adjusted to compensate for the COF offset.

At 604, the equalizer error is averaged and saved as "Noise." At 605, it is determined if Noise is less than Best_Noise. If yes, the instant tap weights of the equalizer filter are saved as the "Best EQ Weights," and the instant COF_nom is assigned to "Best COF_nom" at 606. It is checked at 607 whether the number of iterations has been exhausted. If not, the foregoing 602-607 are repeated to obtain a set of weights that lead to a satisfactory noise level of the equalizer.

If the number of iterations has been exhausted, the EQ Weights and the COF_nom are assigned with Best EQ Weights and the best COF_nom respectively at 608. In subsequent equalization process, both the acquisition state 609 and the tracking state 610, the tap weights of the equalizer filter are adapted to current channel characteristics. Also, the weights are adjusted based on the COF offset.

Figure 7:
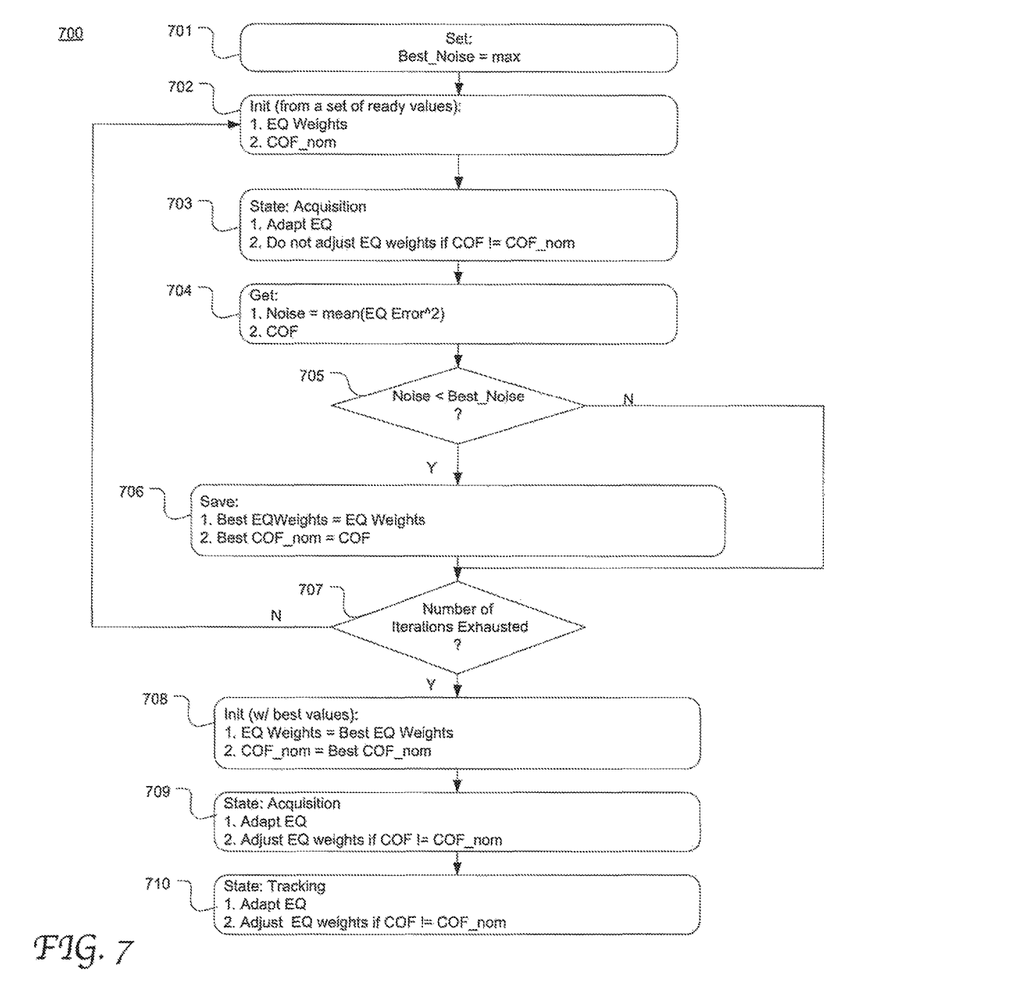
FIG. 7 is a flow chart of pseudo code for an exemplary equalization process with both equalization adaptation and COF correction enabled according to an embodiment of the present disclosure.

FIG. 7 is a flow chart of pseudo code for an exemplary equalization process 700 with both equalization adaptation and COF correction enabled according to an embodiment of the present disclosure. In this mode, the COF is not corrected during acquisition state. If the SNR obtained after acquisition is above a certain threshold, the achieved COF after acquisition is set as COF_nom. Then, during tracking, the two main taps before and after RefTap are corrected, so the COF is the same as the set optimal COF_nom.

More specifically, at 701, a noise threshold (Best_Noise) is set as "max." At 702, the tap weights and COF_nom of the equalizer filter are initialized using a set of ready values. At 703, the acquisition state is configured such that the equalizer is adaptive to the channel characteristics, but the EQ Weights are not adjusted based on the COF offset.

At 704, the equalizer error averaged and saved as "Noise," and the COF is computed. At 705, it is determined if Noise is less than Best_Noise. If yes, the instant EQ weights are saved as the "Best EQ Weights," and the instant COF is assigned to "Best COF_nom" at 706. It is checked at 707 whether the number of iterations has been exhausted. If not, the foregoing 702-707 are repeated to obtain a set of weights and COF that lead to a satisfactory noise level of the equalizer.

If the number of iterations has been exhausted, the EQ Weights are assigned with Best EQ Weights at 708. Also, the COF_nom is assigned with Best COF_nom. In the subsequent adaptation process, both the acquisition state 709 and the tracking state 710, the tap weights of the equalizer are adapted to current channel characteristics, and the weights are adjusted based on COF offset if the COF is not equal to COF_nom.

Figure 8:
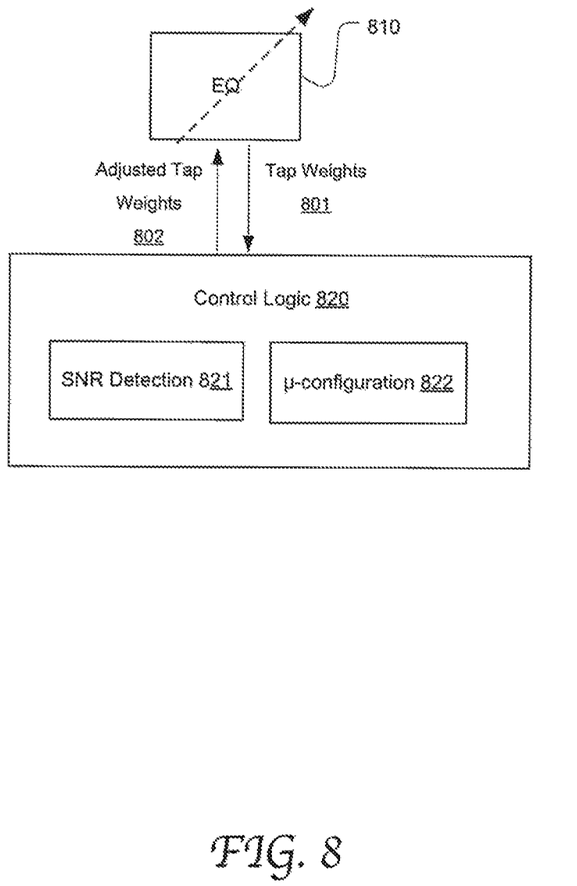
FIG. 8 illustrates the configuration of exemplary control logic coupled to an adaptive equalizer and operable to adjust clock delay correction introduced by the adaptive equalizer according to another embodiment of the present disclosure.

FIG. 8 illustrates the configuration of exemplary control logic 820 coupled to an adaptive equalizer 810 and operable to adjust clock delay correction introduced by the adaptive equalizer 810 according to another embodiment of the present disclosure. In this example, the equalizer 810 may includes a filter having multiple taps, for instance, an FIR filter with 8 taps. Controlled by the adaptation logic in the equalizer 810, the tap weights of the equalizer filter can be adapted through an LMS adaptation process.

The control logic 820 includes a μ-configuration module 822 (or a step size configuration module) which can automatically control the adaptation step sizes for selected tap weights based on the output from the SNR detection 821. In some embodiments, once the SNR is determined to be greater than a threshold value, the μ-configuration module is configured to set the adaptation step sizes for selected taps to 0 and thereby to freeze the adaptation of these taps, whereas the other tap weights continue to be adaptive. For example, only the weights of the main two or three taps of the equalization filter are frozen. Alternatively, the μ-configuration module 822 can output user-defined adaptation step sizes.

The μ-configuration module 2822 is coupled to the LMS module in the adaptive equalizer 810 which implements an LMS adaptation process to iteratively modify the tap weights 801 of the FIR filter based on the step sizes output from the μ-configuration module 822.

In some other embodiments, the adaptation of equalization is configured to be slow or slowed down by using the speed or bandwidth of the timing recovery loop as a reference. For instance, the adaptation time is controlled to be ten times less than 1/BW of the timing recovery loop, where BW represents bandwidth. This can be implemented by setting very small adaptation step sizes for selected tap weights. Particularly, the adaptation of a set of selected taps of the equalization filter is configured to be slow with reference to 1/BW of the timing recovery loop, whereas the other taps are adapted to the channel variations over time at a higher speed than the selected taps. For example, the selected taps are the three main taps including the tap before the RefTap, the RefTap and the tap after the RefTap, where the RefTap is the tap with the largest weight. Thus, the adaptation speed is controlled by setting small step sizes for the first three main taps. It will be appreciated that the present disclosure is not limited to any specific selection of tap(s) that can be frozen or slowed down for equalization adaptation.

In some embodiments, the adaptive coefficients in a loop filter (e.g., loop filter 115 in FIG. 1) $K_p$ and $K_i$ control the speed of the timing recovery loop, and thus $K_p$ and $K_i$ can be input to the µ-configuration module 822 for deriving the bandwidth of the timing recovery loop and, thereby, for determining appropriate step sizes of the selected tap weights in the adaptation process.

Figure 9:
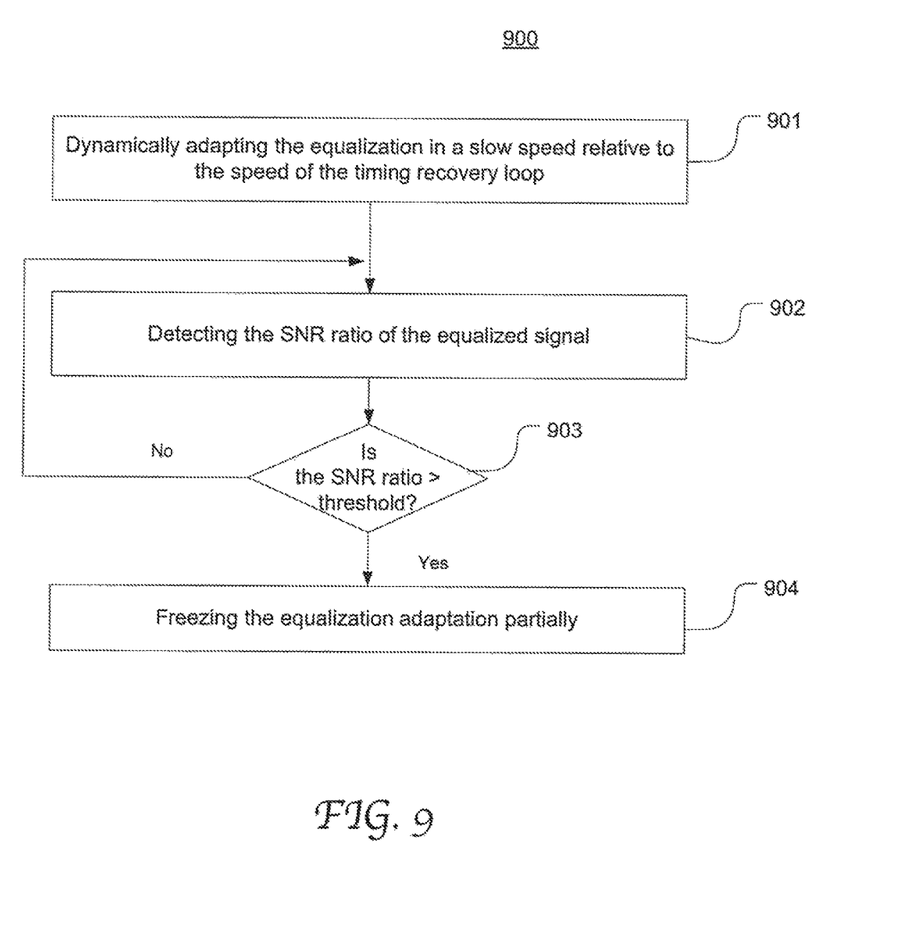
FIG. 9 illustrates an exemplary process of controlling channel response adaptation time according to an embodiment of the present disclosure.

FIG. 9 illustrates an exemplary process 900 of controlling channel response adaptation time according to an embodiment of the present disclosure. Process 900 can be performed by the adaptation control logic in an equalizer, e.g., 820 in FIG. 8. At 901, the µ-configuration module determines the respective step sizes to update the first set of tap weights based on the bandwidth of the timing recovery loop, e.g., the first three main taps.

At 902, the first set of tap weights are iteratively updated based on the error signal and the respective step sizes according to the LMS adaptation process.

At 903, the SNR of the equalized signal is evaluated and used as the performance indicator of equalization. At 904, it is determined whether the SNR is greater than the threshold. If yes, the adaptation step sizes of a second set of tap weights are set to zero and, thereby, the adaptation of these taps is stopped. The first and second sets may include the same or a different selection of tap weights. It will be appreciated that any other suitable parameter is well-known in the art can also be used for an indicator that operates to trigger freezing of the adaptation process.

Figure 10:
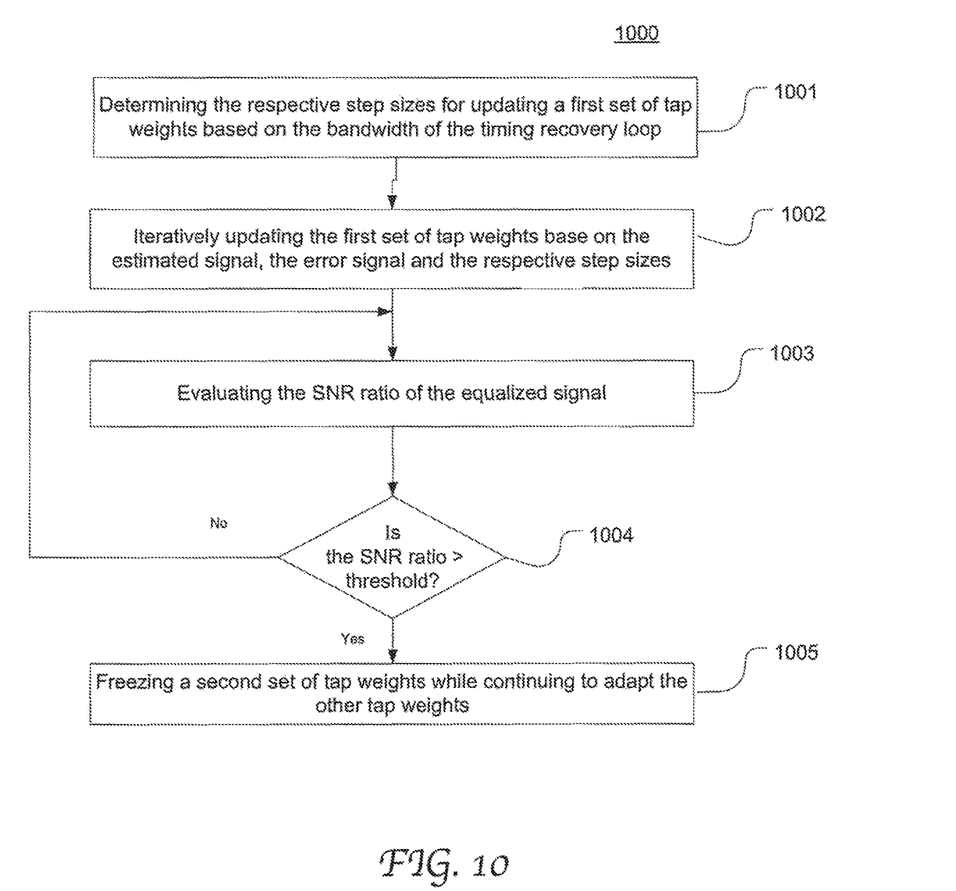
FIG. 10 illustrates an exemplary process of controlling equalization adaptation speed according to another embodiment of the present disclosure.

FIG. 10 illustrates an exemplary process 1000 of controlling equalization adaptation speed according to another embodiment of the present disclosure. Process 1000 can also performed by the adaptation control logic in an equalizer, e.g., 820 in FIG. 8. At 1001, the equalization process is dynamically adapted in a slow speed. The speed is determined based on the bandwidth of the entire timing recovery loop. At 1002, the SNR of the equalized signal, or any other parameter that indicates equalization performance, is detected and evaluated against a threshold value at 1003. At 1004, the adaptation of equalization is stopped partially, meaning only selected taps are frozen. As such, these tap weights that have been updated in the adaptation process are fixed and used for subsequent channel equalization.

Although certain preferred embodiments and methods have been disclosed herein, it will be apparent from the ongoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of timing recovery for signals transmitted via serial links, said method comprising:
during said timing recovery, generating an equalized signal responsive to a digital input signal based on a set of equalizer parameters;
dynamically adapting said equalized signal to a channel response that varies with time, wherein said dynamically adapting comprises iteratively updating said set of equalizer parameters by using respective adaptation step sizes thereof during said timing recovery; and
responsive to a determination that an evaluation signal reaches a threshold, reducing a speed of said iteratively updating said set of equalizer parameters by decreasing adaptation step sizes of a selected subset of equalizer parameters of said set of equalizer parameters while preserving adaptation step sizes of a rest of said set of equalizer parameters, wherein said evaluation signal is indicative of quality of said equalized signal.

2. The method of claim 1, wherein said decreasing comprises setting said adaptation step sizes of said selected subset of equalizer parameters to zero.

3. The method of claim 1, wherein said decreasing comprises setting said adaptation step sizes of said selected subset of equalizer parameters to values greater than 0.

4. The method of claim 1, wherein said generating said equalized signal comprises applying a Finite Impulse Response (FIR) filter on said equalized signal, and wherein said set of equalizer parameters correspond to tap weights of said FIR filter.

5. The method of claim 4, wherein said iteratively updating comprises updating said tap weights using a Least-Mean-Square (LMS) process.

6. The method of claim 4, wherein said selected subset of equalizer parameters correspond to first three main tap weights of said FIR filter.

7. The method of claim 1 wherein said evaluation signal represents a Signal-to-Noise Ratio (SNR) of said equalized signal.

8. The method of claim 1, wherein said decreasing comprises decreasing said adaptation step sizes according to a bandwidth of a timing recovery loop.

9. The method of claim 1, wherein said decreasing comprises decreasing said adaptation step sizes to be smaller than a reciprocal of a bandwidth of a timing recovery loop.

10. A device for signal processing, said device comprising:
an equalizer configured to generate an equalized signal responsive to a digital input signal, wherein said equalizer comprises an equalization filter; and
control logic coupled to said equalizer and configured to:
dynamically adapt said equalized signal to a channel response that varies with time, wherein dynamically adapting comprises iteratively updating a set of equalizer parameters of said equalization filter by using respective adaptation step sizes thereof; and
responsive to a determination that an evaluation signal reaches a threshold, decrease adaptation step sizes of a selected subset of equalizer parameters of said set of equalizer parameters while preserving adaptation step sizes of a rest of said set of equalizer parameters, wherein said evaluation signal is indicative of quality of said equalized signal, wherein said decreasing comprises decreasing said adaptation step sizes according to a bandwidth of a timing recovery loop.

11. The device of claim 10, wherein said control logic comprises a step size configuration module configured to set said adaptation step sizes of said selected subset of equalizer parameters to zero.

12. The device of claim 10, wherein said control logic comprises a step size configuration module configured to set said adaptation step sizes of said selected subset of equalizer parameters to values greater than 0.

13. The device of claim 10, wherein said equalization filter comprises a Finite Impulse Response (FIR) filter, and wherein further said set of equalizer parameters correspond to tap weights of said FIR filter.

14. The device of claim 13, wherein said control logic is configured to iteratively update said tap weights using a Least-Mean-Square (LMS) process.

15. The device of claim 13, wherein said selected subset of equalizer parameters correspond to first three main tap weights of said FIR filter.

16. The device of claim 10, wherein said evaluation signal represents a Signal-to-Noise Ratio (SNR) of said equalized signal.

17. A receiver comprising:
- an Analog-to-Digital Converter (ADC) configured to generate a digital input signal based on a received analog signal that is transmitted via a communication channel and, further, based on a recovered clock signal;
- a timing recovery loop coupled to said ADC and configured to generate said recovered clock signal, wherein said timing recovery loop comprises:
  - an equalizer configured to generate an equalized signal responsive to said digital input signal during timing recovery, wherein said equalizer comprises an equalization filter; control logic coupled to said equalizer and configured to:
    - dynamically adapt said equalized signal to a channel response that varies with time, wherein dynamically adapting comprises iteratively updating a set of equalizer parameters by using respective adaptation step sizes thereof; and
    - responsive to a determination that an evaluation signal reaches a threshold and during said timing recovery, reducing a speed of said iteratively updating said set of equalizer parameters by decreasing adaptation step sizes of a selected subset of equalizer parameters of said set of equalizer parameters while preserving adaptation step sizes of a rest of said set of equalizer parameters, wherein said evaluation signal is indicative of quality of said equalized signal; and
  - a phase detector coupled to said equalizer and said control logic.

18. The receiver of claim 17, wherein said control logic comprises a step size configuration module configured to set said adaptation step sizes of said selected subset of equalizer parameters to zero.

19. The receiver of claim 17, wherein said control logic comprises a step size configuration module configured to set said adaptation step sizes of said selected subset of equalizer parameters to values greater than 0, wherein said values are determined based on a bandwidth of said timing recovery loop.

* * * * *